United States Patent
Dai et al.

(10) Patent No.: US 11,570,306 B2
(45) Date of Patent: Jan. 31, 2023

(54) CALL PROCESSING METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Jun Dai, Beijing (CN); Jinli Dong, Beijing (CN); Guiping Wang, Beijing (CN); Guorui Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 166 days.

(21) Appl. No.: 17/011,021

(22) Filed: Sep. 3, 2020

(65) Prior Publication Data

US 2021/0075912 A1    Mar. 11, 2021

(30) Foreign Application Priority Data

Sep. 10, 2019 (CN) .......................... 201910851149.3

(51) Int. Cl.
*H04M 3/527* (2006.01)
*G10L 15/18* (2013.01)
*G10L 15/22* (2006.01)
*H04M 3/42* (2006.01)

(52) U.S. Cl.
CPC ......... *H04M 3/527* (2013.01); *G10L 15/1815* (2013.01); *G10L 15/22* (2013.01); *H04M 3/42059* (2013.01)

(58) Field of Classification Search
CPC ............. H04M 3/527; H04M 3/42059; H04M 2201/40; H04M 3/432; H04M 3/53333; H04M 3/53358; H04M 1/64; H04M 1/72484; H04M 1/72454; G10L 15/1815; G10L 15/22
See application file for complete search history.

(56) References Cited

U.S. PATENT DOCUMENTS

| | | | | |
|---|---|---|---|---|
| 5,333,186 A | * | 7/1994 | Gupta | H04M 3/4878 379/93.12 |
| 5,867,494 A | * | 2/1999 | Krishnaswamy | H04Q 3/64 379/114.15 |
| 5,930,700 A | * | 7/1999 | Pepper | H04Q 3/005 455/435.3 |
| 6,229,878 B1 | * | 5/2001 | Moganti | H04M 1/6505 379/100.06 |
| 6,351,464 B1 | * | 2/2002 | Galvin | H04M 3/42229 379/900 |

(Continued)

*Primary Examiner* — Lisa Hashem
(74) *Attorney, Agent, or Firm* — Brooks Kushman P.C.

(57) ABSTRACT

The present disclosure provides a call processing method, apparatus, electronic device and storage medium and relates to the field of cloud computing. The method may comprise: obtaining a calling subscriber's status information in real time while an intelligent dialogue robot is used to make a call with the calling subscriber; when it is determined that a call form of the intelligent dialogue robot needs to be adjusted, correspondingly adjusting the call form of the intelligent dialogue robot according to current status information of the calling subscriber. The solution of the present disclosure may be employed to improve the call performance of the intelligent dialogue robot.

8 Claims, 3 Drawing Sheets

(56) References Cited

U.S. PATENT DOCUMENTS

| | | | | |
|---|---|---|---|---|
| 6,560,649 B1* | 5/2003 | Mullen | H04L 67/51 | 709/226 |
| 7,167,899 B2* | 1/2007 | Lee | H04M 7/0027 | 709/227 |
| 7,873,519 B2* | 1/2011 | Bennett | G06F 40/237 | 704/243 |
| 7,970,107 B2* | 6/2011 | Tal | H04M 3/42195 | 379/88.04 |
| 8,050,387 B1* | 11/2011 | Putnam | H04M 1/663 | 379/76 |
| 8,897,757 B2* | 11/2014 | Epp | H04M 1/64 | 455/414.1 |
| 8,948,371 B2* | 2/2015 | Odinak | H04M 3/5238 | 379/266.06 |
| 9,584,663 B2* | 2/2017 | Czachor, Jr. | H04M 3/42195 | |
| 10,944,870 B1* | 3/2021 | Paiva | H04M 3/5166 | |
| 11,328,205 B2* | 5/2022 | Adibi | G06Q 30/016 | |
| 2010/0145774 A1* | 6/2010 | Veshnyakov | G07C 13/00 | 707/769 |
| 2016/0127551 A1* | 5/2016 | Scott | H04M 3/533 | 455/413 |
| 2021/0004536 A1* | 1/2021 | Adibi | G06F 16/2379 | |
| 2022/0051664 A1* | 2/2022 | Baror | H04M 3/4936 | |
| 2022/0141335 A1* | 5/2022 | Beaver | G06F 40/30 | 379/265.09 |

\* cited by examiner

CALL PROCESSING METHOD, ELECTRONIC DEVICE AND STORAGE MEDIUM

CROSS-REFERENCE TO RELATED APPLICATIONS

The present application claims the priority of Chinese Patent Application No. 2019108511493, filed on Sep. 10, 2019, with the title of "Call processing method, apparatus, electronic device and storage medium". The disclosure of the above applications is incorporated herein by reference in its entirety.

TECHNICAL FIELD

The present disclosure relates to the field of computer application, and particularly to a call processing method, apparatus, electronic device and storage medium in the field of cloud computing.

BACKGROUND

At present, an intelligent dialogue robot (e.g., a call-answering secretary robot) emerges gradually. When a mobile phone subscriber does not want to answer a call or is inconvenient to answer the call, the intelligent dialogue robot may help answer the call. The intelligent dialogue robot will make the call (namely, speech interaction) with the calling subscriber, collect the intents of the incoming call, collate the intents into a digest and send the digest to the called subscriber.

The intelligent dialogue robot brings great convenience to the subscribers, but it also has certain drawbacks, for example, the call form is fixed, i.e., a single call form can only be employed for the call, and the performance of the call is undesirable.

SUMMARY

In view of the above, the present disclosure provides a call processing method, apparatus, electronic device and storage medium.

Specific technical solutions are as follows:

A call processing method, comprising: obtaining a calling subscriber's status information in real time while an intelligent dialogue robot is used to make a call with the calling subscriber; when it is determined that a call form of the intelligent dialogue robot needs to be adjusted, correspondingly adjusting the call form of the intelligent dialogue robot according to current status information of the calling subscriber.

According to a preferred embodiment of the present disclosure, the method further comprises: before making the call, obtaining basic character setting set by a called subscriber for the intelligent dialogue robot; correspondingly adjusting the call form of the intelligent dialogue robot in conjunction with the basic character setting of the intelligent dialogue robot and the current status information of the calling subscriber.

According to a preferred embodiment of the present disclosure, the method further comprises: before making the call, obtaining tag information of an incoming call number; correspondingly adjusting the call form of the intelligent dialogue robot in conjunction with the tag information of the incoming call number and the current status information of the calling subscriber.

According to a preferred embodiment of the present disclosure, the method further comprises: before making the call, obtaining basic character setting set by the called subscriber for the intelligent dialogue robot, and obtaining tag information of the incoming call number; correspondingly adjusting the call form of the intelligent dialogue robot in conjunction with the basic character setting of the intelligent dialogue robot, the tag information of the incoming call number and the current status information of the calling subscriber.

According to a preferred embodiment of the present disclosure, obtaining a calling subscriber's status information in real time comprises: obtaining an intent conveyed by the calling subscriber and the calling subscriber's call form in real time, and determining the calling subscriber's status information according to the obtained information.

According to a preferred embodiment of the present disclosure, the method further comprises: after the call ends, updating the tag information of the incoming call number according to the call content.

According to a preferred embodiment of the present disclosure, the correspondingly adjusting the call form of the intelligent dialogue robot comprises: determining a call form suitable in the current situation by querying a preset correspondence relationship table, and adjusting the call form of the intelligent dialogue robot to the determined call form.

A call processing apparatus, comprising: an obtaining unit and a judging unit; the obtaining unit is configured to obtain a calling subscriber's status information in real time while an intelligent dialogue robot is used to make a call with the calling subscriber; the adjusting unit is configured to, when it is determined that a call form of the intelligent dialogue robot needs to be adjusted, correspondingly adjust the call form of the intelligent dialogue robot according to current status information of the calling subscriber.

According to a preferred embodiment of the present disclosure, the obtaining unit is further configured to, before making the call, obtain basic character setting set by a called subscriber for the intelligent dialogue robot; the adjusting unit is further configured to correspondingly adjust the call form of the intelligent dialogue robot in conjunction with the basic character setting of the intelligent dialogue robot and the current status information of the calling subscriber.

According to a preferred embodiment of the present disclosure, the obtaining unit is further configured to, before making the call, obtain tag information of an incoming call number; the adjusting unit is further configured to correspondingly adjust the call form of the intelligent dialogue robot in conjunction with the tag information of the incoming call number and the current status information of the calling subscriber.

According to a preferred embodiment of the present disclosure, the obtaining unit is further configured to, before making the call, obtain basic character setting set by the called subscriber for the intelligent dialogue robot, and obtain tag information of the incoming call number; the adjusting unit is further configured to adjust the call form of the intelligent dialogue robot in conjunction with the basic character setting of the intelligent dialogue robot, the tag information of the incoming call number and the current status information of the calling subscriber.

According to a preferred embodiment of the present disclosure, the obtaining unit obtains an intent conveyed by the calling subscriber and the calling subscriber's call form in real time, and determines the calling subscriber's status information according to the obtained information.

According to a preferred embodiment of the present disclosure, the adjusting unit is further configured to, after the call ends, update the tag information of the incoming call number according to the call content.

According to a preferred embodiment of the present disclosure, the adjusting unit determines a call form suitable in the current situation by querying a preset correspondence relationship table, and adjusts the call form of the intelligent dialogue robot to the determined call form.

An electronic device, comprising: at least one processor; and a memory communicatively connected with the at least one processor; wherein, the memory stores instructions that may be executed by the at least one processor, the instructions, when executed by the at least one processor, causing the at least one processor to perform the above method.

A non-transitory computer-readable storage medium storing computer instructions which enable the computer to execute the above method.

As can be seen from the above introduction, with the solution of the present disclosure being employed, the call form of the intelligent dialogue robot making a call with the calling subscriber may be adjusted according to the status information of the calling subscriber, thereby enhancing the performance of call and better satisfying the needs for call in different situations; furthermore, on the basis of the status information of the calling subscriber, it is further possible to adjust the call form of the intelligent dialogue robot in conjunction with the basic character setting set by the called subscriber for the intelligent dialogue robot and/or the tag information of the incoming call number, thereby enabling the adjusted call form to better meet the subscriber's demands, and to be more purposeful; in addition, the tag information of the incoming call number may be updated according to the call content, thereby ensuring the accuracy of the tag information and thereby enhancing the accuracy of the adjustment result.

BRIEF DESCRIPTION OF THE DRAWINGS

The figures are presented to facilitate better understanding of the solutions and do not constitute limitations of the present disclosure, wherein.

DETAILED DESCRIPTION

Technical solutions of the present disclosure will be described in more detail in conjunction with figures and embodiments to make technical solutions of the present disclosure clear and more apparent.

Obviously, the embodiments described here are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
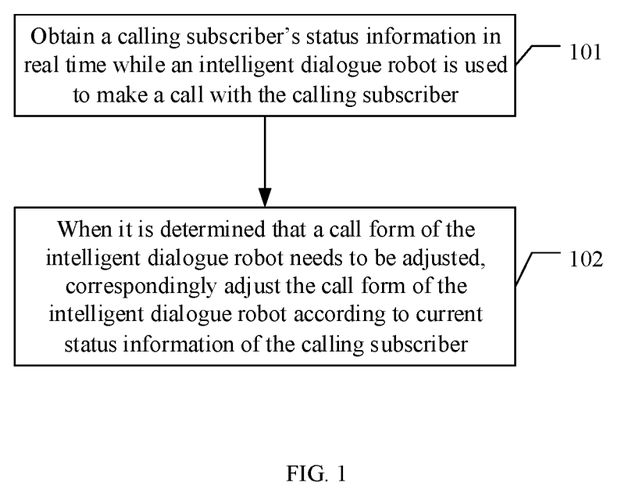
FIG. 1 is a flow chart of a call processing method according to a first embodiment of the present disclosure.

FIG. 1 is a flow chart of a call processing method according to a first embodiment of the present disclosure. As shown in FIG. 1, the embodiment comprises the following specific implementation mode.

At 101, a calling subscriber's status information is obtained in real time while an intelligent dialogue robot is used to make a call with the calling subscriber.

At 102, if it is determined that a call form of the intelligent dialogue robot needs to be adjusted, the call form of the intelligent dialogue robot is adjusted according to the current status information of the calling subscriber.

In the current manner, when a mobile phone subscriber does not want to answer a call or is inconvenient to answer the call, the intelligent dialogue robot may help answer the call. The intelligent dialogue robot will make a call with the calling subscriber. Correspondingly, it is necessary to complete a series of the following processing: speech recognition, semantic parsing, speech synthesis and so on, namely, perform speech recognition for the speech from the calling subscriber, perform semantic parsing for a speech recognition result, generate a reply speech according to a semantic parsing result.

In the present embodiment, on the basis of the above processing, the following processing is further added: obtaining a calling subscriber's status information in real time while the intelligent dialogue robot is used to make a call with the calling subscriber, and when it is determined that a call form of the intelligent dialogue robot needs to be adjusted, adjusting the call form of the intelligent dialogue robot according to the current status information of the calling subscriber.

Preferably, it is possible to obtain the intent conveyed by the calling subscriber and the calling subscriber's call form in real time, and determine the calling subscriber's status information according to the intent conveyed by the calling subscriber and the calling subscriber's call form as obtained.

The calling subscriber's status information may include but is not limited to: chat, complaints, and communication about formal matters. The calling subscriber's call form may include, but is not limited to, volume, intonation and speaking speed. How to obtain the intent conveyed by the calling subscriber and the calling subscriber's call form is of the prior art. In addition, regarding the intent conveyed by the calling subscriber and the calling subscriber's call form as obtained, the calling subscriber's status information may be determined based on a preset evaluation rule and the like. For example, if the called subscriber is a leader in a company, the calling subscriber's intent is to reflect an issue about attitude of an employee of the company in communication, and the calling subscriber's call form is loud voice and fast speaking rate and so on, it may be determined based on the evaluation rule that the calling subscriber's status is complaining.

When it is determined that the call form of the intelligent dialogue robot needs to be adjusted, the call form of the intelligent dialogue robot may be adjusted according to the current status information of the calling subscriber. For example, if the calling subscriber's status information is first status information when the intelligent dialogue robot ends up a call last time and the calling subscriber's status information is determined as second status information after the call of this time starts, it may be determined that the call form of the intelligent dialogue robot needs to be adjusted, and then, if the calling subscriber's status information is determined as third status information (possibly because the previously-determined status is wrong or the calling subscriber indeed alters the status), it may be determined again that the call form of the intelligent dialogue robot needs to be adjusted. Again for example, after call is completed each time, the call form of the intelligent dialogue robot may be adjusted as a default status; if the calling subscriber's status information is determined as the second status information after the call of this time starts, it may be determined that the call form of the intelligent dialogue robot needs to be adjusted. The above manners of "determining that a call form of the intelligent dialogue robot needs to be adjusted" are only intended for exemplary illustration purpose and not intended to limit the technical solution of the present disclosure. A specific determining, manner may depend on actual needs.

Preferably, when it is determined that the call form of the intelligent dialogue robot needs to be adjusted, it is possible to determine a call form suitable in the current situation by querying a preset correspondence relationship table, and adjust the call form of the intelligent dialogue robot to the determined call form.

For example, it is feasible to preset call forms of the intelligent dialogue robot corresponding to the calling subscriber's different status information respectively, form a correspondence relationship table, and then determine a call form of the intelligent dialogue robot suitable in the current situation by querying the correspondence relationship table. If the calling subscriber's status is complaining, it is possible to query to obtain a call form of the intelligent dialogue robot corresponding to the complaining status, and correspondingly adjust the call form of the intelligent dialogue robot.

In the above manner, it is possible to implement corresponding adjustment of the call form of the intelligent dialogue robot taking with the calling subscriber according to the calling subscriber's status information, thereby enhance the call performance and better satisfy the calling needs in different situations.

Preferably, the following processing may be further performed in the present embodiment.

1) Before making a call, obtaining basic character setting set by the called subscriber for the intelligent dialogue robot, and correspondingly adjusting the call form of the intelligent dialogue robot in conjunction with the basic character setting of the intelligent dialogue robot and the current status information of the calling subscriber.

That is, before the call is connected, it is possible to obtain desired basic character setting of the subscriber's own intelligent dialogue robot, for example, male's voice or female's voice. It is possible to display the basic character setting on a relevant interface for selection by the subscriber, and regard the subscriber-selected basic character setting as the obtained basic character setting set by the called subscriber for the intelligent dialogue robot.

During use of the intelligent dialogue robot to make a call with the calling subscriber, it is feasible to obtain the calling subscriber's status information in real time, and when it is determined that the call form of the intelligent dialogue robot needs to be adjusted, correspondingly adjust the call form of the intelligent dialogue robot in conjunction with the basic character setting of the intelligent dialogue robot and the current status information of the calling subscriber, namely, adjust the call form of the intelligent dialogue robot to a call form corresponding to the basic character setting of the intelligent dialogue robot and the current status information of the calling subscriber.

In this manner, the adjustment of the call form of the intelligent dialogue robot can be made more compliant with the subscriber's requirements.

2) before making the call, obtaining tag information of an incoming call number, and correspondingly adjust the call form of the intelligent dialogue robot in conjunction with the tag information of the incoming call number and the current status information of the calling subscriber.

In other words, before the call is connected, the tag information of the incoming call number may be obtained. In addition, during use of the intelligent dialogue robot to make the call with the calling subscriber, it is feasible to obtain the calling subscriber's status information in real time, and when it is determined that the call form of the intelligent dialogue robot needs to be adjusted, correspondingly adjust the call form of the intelligent dialogue robot in conjunction with the tag information of the incoming call number and the current status information of the calling subscriber, i.e., adjust the call form of the intelligent dialogue robot to a call form corresponding to the tag information of the incoming call number and the status information of the calling subscriber.

The tag information of the incoming call number may include but not limited to: a system tag, a user self-defined tag, a local unknown incoming call and a remote unknown incoming call and so on. The system tag may include a marketing call, a crank call and so on. Such tags may be obtained in a current manner. The user self-defined tag may include friend, superior, family member and so on, and may be a tag set by the called subscriber for different phone numbers in the called subscriber's mobile phone contacts.

In this way, the call form of the intelligent dialogue robot may be adjusted in conjunction with the tag information of the incoming call number to make the adjustment more purposeful.

After the call ends, the tag information of the incoming call number may be updated according to the call content. For example, if the previous tag of the incoming call number is a marketing call, but the call content of this time has nothing to do with marketing, the tag of the marketing call may be removed; when the call from the incoming call number is received next time, its tag may become a local unknown incoming call or a remote unknown incoming call. In this manner, the accuracy of the tag information is ensured, and thereby the accuracy of a result of adjusting the call form of the intelligent dialogue robot is improved.

3) Before making the call, obtaining basic character setting set by the called subscriber for the intelligent dialogue robot, obtaining tag information of the incoming call number, and correspondingly adjusting the call form of the intelligent dialogue robot in conjunction with the basic character setting of the intelligent dialogue robot, the tag information of the incoming call number and the current status information of the calling subscriber.

In other words, before the call is connected, it is possible to obtain desired basic character setting of the subscriber's own intelligent dialogue robot, for example, male's voice or female's voice, and obtain the tag information of the incoming call number. In addition, during use of the intelligent dialogue robot to make the call with the calling subscriber, it is feasible to obtain the calling subscriber's status information in real time, and when it is determined that the call form of the intelligent dialogue robot needs to be adjusted, correspondingly adjust the call form of the intelligent dialogue robot in conjunction with the basic character setting of the intelligent dialogue robot, the tag information of the incoming call number and the current status information of the calling subscriber, i.e., adjust the call form of the intelligent dialogue robot to a call form corresponding to the basic character setting of the intelligent dialogue robot, the tag information of the incoming call number and the status information of the calling subscriber.

In this way, the adjustment of the call form of the intelligent dialogue robot can be made more compliant with the subscriber's requirements and more purposeful.

In the present embodiment, the adjusted call form of the intelligent dialogue robot may include but is not limited to: timbre, volume, intonation and speaking speed and the like. That is to say, it is possible to perform all-round adjustment for the call form of the intelligent dialogue robot in all aspects, thereby further improve the performance of the call and enhance the human-simulating degree.

Figure 2:
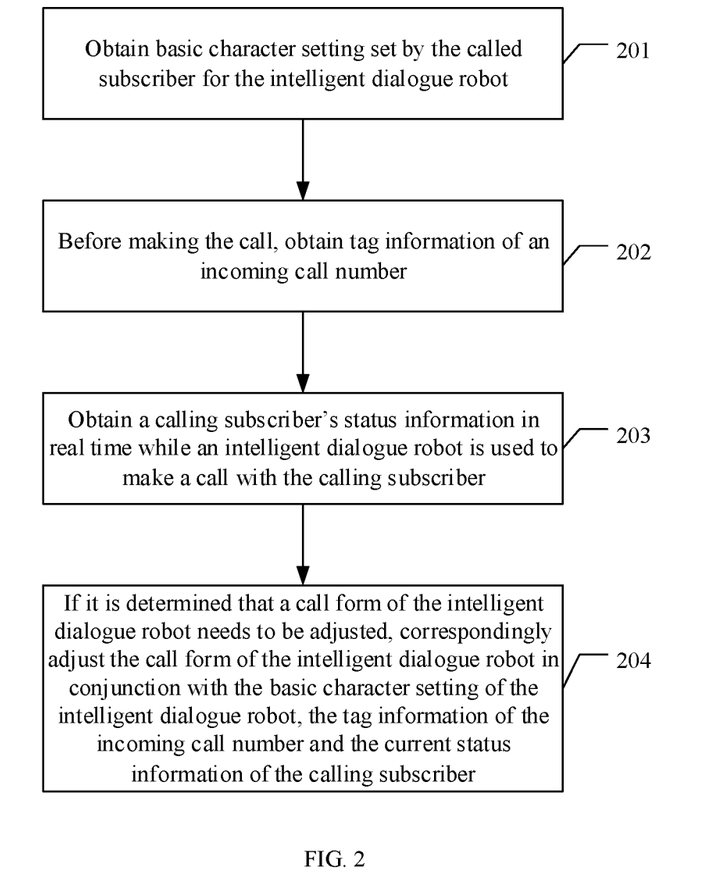
FIG. 2 is a flow chart of a call processing method according to a second embodiment of the present disclosure.

Based on the above introduction, FIG. 2 is a flow chart of a call processing method according to the present disclosure. As shown in FIG. 2, the following specific implementation mode is included.

At 201 is obtained basic character setting set by the called subscriber for the intelligent dialogue robot.

It is possible to display the basic character setting on a relevant interface for selection by the subscriber, and regard the subscriber-selected basic character setting as the obtained basic character setting set by the called subscriber for the intelligent dialogue robot.

For example, if the called subscriber is a male, the basic character setting set by called subscriber for his intelligent dialogue robot may be a male's voice. For another example, if the called subscriber is a female, the basic character setting set by called subscriber for his intelligent dialogue robot may be a female's voice.

Subsequently, if necessary, the called subscriber may modify the basic character setting set for the intelligent dialogue robot at any time.

At 202, tag information of an incoming call number is obtained before making a call.

The tag information of the incoming call number may include but not limited to: a system tag, a user self-defined tag, a local unknown incoming call and a remote unknown incoming call and so on. The system tag may include a marketing call, a crank call and so on. Such tags may be obtained in a current manner. The user self-defined tag may include friend, superior, family member and so on, and may be a tag set by the called subscriber for different phone numbers in the called subscriber's mobile phone contacts.

After the call ends, the tag information of the incoming call number may be updated according to the call content. Certainly, the tag information needn't be updated, this operation needn't be performed.

At 203, status information of the calling subscriber is obtained in real time while using the intelligent dialogue robot to make the call with the calling subscriber.

Preferably, it is possible to obtain the intent conveyed by the calling subscriber and the subscribing subscriber's call form, and determine the calling subscriber's status information according to the obtained information.

The calling subscriber's status information may include but is not limited to: chat, complaints, and communication about formal matters. The calling subscriber's call form may include, but is not limited to, volume, intonation and speaking speed. How to obtain the intent conveyed by the calling subscriber and the calling subscriber's call form is of the prior art. In addition, regarding the intent conveyed by the calling subscriber and the calling subscriber's call form as obtained, the calling subscriber's status information may be determined based on a preset evaluation rule and the like.

At 204, if it is determined that a call form of the intelligent dialogue robot needs to be adjusted, the call form of the intelligent dialogue robot is adjusted in conjunction with the basic character setting of the intelligent dialogue robot, the tag information of the incoming call number and the current status information of the calling subscriber.

Preferably, when it is determined that the call form of the intelligent dialogue robot needs to be adjusted, it is possible to determine a call form suitable in the current situation by querying a preset correspondence relationship table, and adjust the call form of the intelligent dialogue robot to the determined call form.

Specifically, it is possible to preset call forms of the intelligent dialogue robot corresponding to different combination results respectively, to form a correspondence relationship table. Each combination result may consist of the basic character setting of the intelligent dialogue robot the tag information of the incoming call number+the status information of the calling subscriber, thereby determine a call form of the intelligent dialogue robot suitable in the current situation by querying the correspondence relationship table, and adjust the call form of the intelligent dialogue robot accordingly.

For example, if the current situation is male's voice (the basic character setting of the intelligent dialogue robot)+ friend (the tag information of the incoming call number)+ chat (the current status information of the calling subscriber) and corresponds to the first call form, the call form of the intelligent dialogue robot may be adjusted to the first call form.

Again for example, if the current situation is female's voice (the basic character setting of the intelligent dialogue robot+superior (the tag information of the incoming call number)+communication about a formal matter (the current status information of the calling subscriber) and corresponds to the second call form, the call form of the intelligent dialogue robot may be adjusted to the second call form. Then, assuming that the status of the calling subscriber switches to a chat status after the communication about the formal matter is completed, the current situation becomes female's voice (the basic character setting of the intelligent dialogue robot)+superior (the tag information of the incoming call number)+chat (the current status information of the calling subscriber) and corresponds to the third call form, the call form of the intelligent dialogue robot may be adjusted to the third call form.

The adjusted call form of the intelligent dialogue robot may include but is not limited to: timbre, volume, intonation and speaking speed and the like.

After the call ends, a digest may be formed from the information collected by the intelligent dialogue robot, and sent to the called subscriber in a manner such as a short message or mail. The digest may include incoming call time, a subscriber for initiating the incoming call/the incoming call number and a summary of call content.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

The above introduces the method embodiments. The solution of the present disclosure will be further described through an apparatus embodiment.

Figure 3:
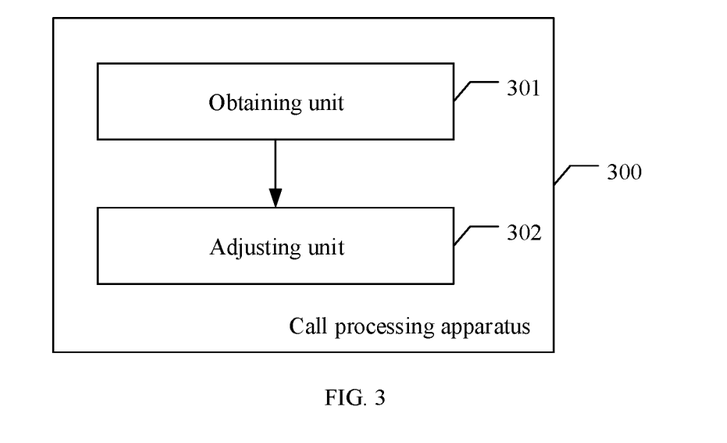
FIG. 3 is a block diagram of a call processing apparatus according to an embodiment of the present disclosure.

FIG. 3 is a block diagram of a call processing apparatus 300 according to an embodiment of the present disclosure. As shown in FIG. 3, the apparatus comprises: an obtaining unit 301 and a judging unit 302.

The obtaining unit 301 is configured to obtain a calling subscriber's status information in real time while an intelligent dialogue robot is used to make a call with the calling subscriber.

The adjusting unit 302 is configured to, if it is determined that a call form of the intelligent dialogue robot needs to be adjusted, adjust the call form of the intelligent dialogue robot according to the current status information of the calling subscriber.

Preferably, the obtaining unit 301 may obtain an intent conveyed by the calling subscriber and the calling subscriber's call form in real time, and determine the calling subscriber's status information according to the intent conveyed by the calling subscriber and the calling subscriber's call form as obtained.

The calling subscriber's status information may include but is not limited to: chat, complaints, and communication about formal matters. The calling subscriber's call form may include, but is not limited to, volume, intonation and speaking speed. How to obtain the intent conveyed by the calling subscriber and the calling subscriber's call form is of the prior art. In addition, regarding the intent conveyed by the calling subscriber and the calling subscriber's call form as obtained, the calling subscriber's status information may be determined based on a preset evaluation rule and the like.

When it is determined that the call form of the intelligent dialogue robot needs to be adjusted, the adjusting unit 302 may adjust the call form of the intelligent dialogue robot according to the current status information of the calling subscriber.

In addition, the obtaining unit 301 may further, before making the call, obtain basic character setting set by the called subscriber for the intelligent dialogue robot, and correspondingly, the adjusting unit 302 may adjust the call form of the intelligent dialogue robot in conjunction with the basic character setting of the intelligent dialogue robot and the current status information of the calling subscriber.

For example, it is possible to display the basic character setting on a relevant interface for selection by the subscriber, and regard the subscriber-selected basic character setting as the obtained basic character setting set by the called subscriber for the intelligent dialogue robot, for example, male's voice, female's voice and so on.

Alternatively, the obtaining unit 301 may further, before making the call, obtain tag information of an incoming call number, and correspondingly, the adjusting unit 302 may adjust the call form of the intelligent dialogue robot in conjunction with the tag information of the incoming call number and the current status information of the calling subscriber.

The tag information of the incoming call number may include but not limited to: a system tag, a user self-defined tag, a local unknown incoming call and a remote unknown incoming call and so on. The system tag may include a marketing call, a crank call and so on. Such tags may be obtained in a current manner. The user self-defined tag may include friend, superior, family member and so on, and may be a tag set by the called subscriber for different phone numbers in the called subscriber's mobile phone contacts.

After the call ends, the adjusting unit 302 may update the tag information of the incoming call number according to the call content.

Alternatively, the obtaining unit 301 may further, before making the call, obtain basic character setting set by the called subscriber for the intelligent dialogue robot, and obtain tag information of the incoming call number, and correspondingly the adjusting unit 302 may adjust the call form of the intelligent dialogue robot in conjunction with the basic character setting of the intelligent dialogue robot, the tag inebriation of the incoming call number and the current status information of the calling subscriber.

Preferably, when it is determined that the call form of the intelligent dialogue robot needs to be adjusted, the adjusting unit 302 may determine a call form suitable in the current situation by querying a preset correspondence relationship table, and adjust the call form of the intelligent dialogue robot to the determined call form.

A specific workflow of the apparatus embodiment shown in FIG. 3 will not be detailed any more here, and reference may be made to corresponding depictions in the above method embodiment.

To sum up, with the solution of the present disclosure being employed, the call form of the intelligent dialogue robot making the call with the calling subscriber may be adjusted according to the status information of the calling subscriber, thereby enhancing the performance of call and better satisfying the needs for call in different situations; furthermore, on the basis of the status information of the calling subscriber, it is further possible to adjust the call form of the intelligent dialogue robot in conjunction with the basic character setting set by the called subscriber for the intelligent dialogue robot and/or the tag information of the incoming call number, thereby enabling the adjusted call form to better meet the subscriber's demands, and to be more purposeful; in addition, the tag information of the incoming call number may be updated according to the call content, thereby ensuring the accuracy of the tag information and thereby enhancing the accuracy of the adjustment result.

According to embodiments of the present disclosure, the present disclosure further provides an electronic device and a readable storage medium.

Figure 4:
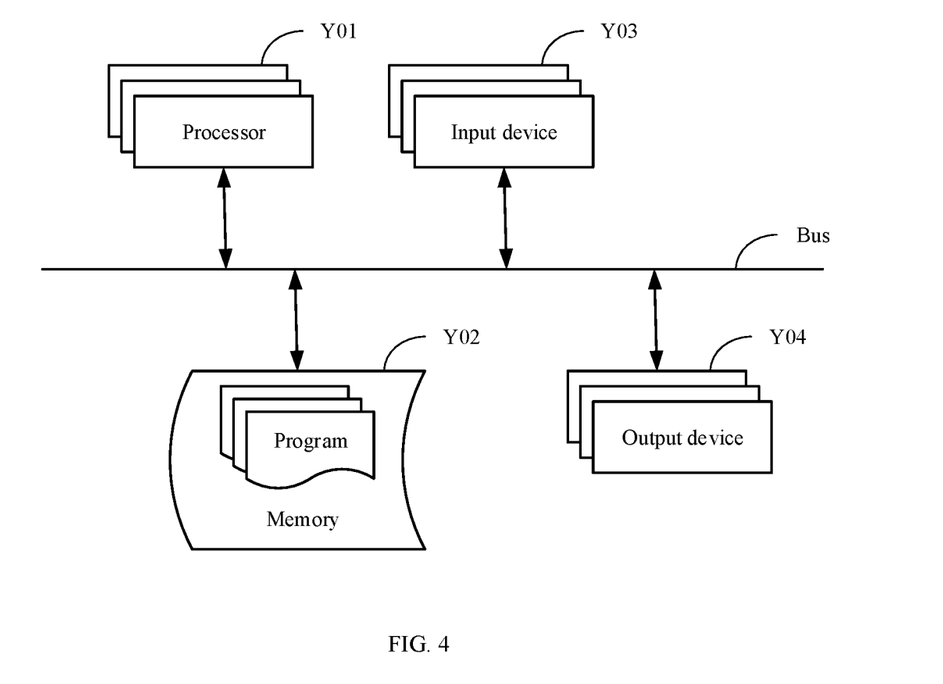
FIG. 4 illustrates a block diagram of an electronic device for implementing a call processing method according to an embodiment of the present disclosure.

As shown in FIG. 4, FIG. 4 illustrates a block diagram of an electronic device for implementing a call processing method according to an embodiment of the present disclosure. The electronic device is intended to represent various forms of digital computers, such as laptops, desktops, workstations, personal digital assistants, servers, blade servers, mainframes, and other appropriate computers. The electronic device is intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the subject matter described and/or claimed in this document.

As shown in FIG. 4, the electronic device includes one or more processors Y01, a memory Y02, and interfaces for connecting various components, including a high-speed interface and a low-speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor is taken as an example in FIG. 4.

The memory Y02 is a non-transitory computer-readable storage medium provided by the present disclosure. The memory stores instructions executable by at least one processor, so that the at least one processor executes the call processing method provided in the present disclosure. The non-transitory computer-readable storage medium of the present disclosure stores computer instructions, which are used to cause a computer to execute the call processing method provided by the present disclosure.

The memory Y02 is a non-transitory computer-readable storage medium, and can be used to store non-transitory software programs, non-transitory computer executable programs, and modules, such as program instructions/modules corresponding to the call processing method in the embodiments of the present disclosure (for example, xx module X01, xx module x02, and xx module x03 shown in FIG. X). The processor Y01 executes various functional applications and data processing of the server, namely, implement the call processing method in the above method embodiments, by running non-transitory software programs, instructions, and modules stored in the memory Y02.

The memory Y02 may include a program storage area and a data storage area, where the program storage area may store an operating system and application programs needed by at least one function; the data storage area may store data created according to the use of the electronic device for the call processing, and the like. In addition, the memory Y02 may include a high-speed random access memory, and may further include a non-transitory memory, such as at least one disk storage device, a flash memory device, or other non-transitory solid-state storage devices. In some embodiments, the memory Y02 may optionally include memories disposed remotely relative to the processor Y01, and these remote memories may be connected to the electronic device for call processing through a network. Examples of the above network include, but are not limited to, the Internet, an intranet, a local area network, a mobile communication network, and combinations thereof.

The electronic device for implementing the call processing method may further include an input device Y03 and an output device Y04. The processor Y01, the memory Y02, the input device Y03 and the output device Y04 may be connected through a bus or in other manners, and exemplarily connected through the bus in FIG. 4.

The input device Y03 may receive inputted numeric or character information, and generate key signal inputs related to user settings and function control of the electronic device for call processing, such as a touch screen, keypad, mouse, trackpad, touchpad, pointing stick, one or more mouse buttons, trackballs, joysticks and other input devices. The output device Y04 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples a communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated understood that various forms of the flows shown above may be used, with steps re-ordered, added, or removed. For example, the steps described in the present application can be executed in parallel, sequentially, or in different orders so long as desired results of the technical solutions disclosed in the present disclosure can be achieved, which will not be limited herein.

The above specific implementations do not constitute limitations of the protection scope of the present disclosure. It should be understood by those skilled in the art that various modifications, combinations, sub-combinations and alterations may occur depending on design requirements and other factors. Any modification, equivalent replacement and improvement and the like within the spirit and principle of the present disclosure should be included in the scope of the present disclosure.

What is claimed is:

1. A call processing method, wherein the method comprises:
   obtaining a calling subscriber's status information in real time while an intelligent dialogue robot is used to make a call with the calling subscriber;
   when it is determined that a call form of the intelligent dialogue robot needs to be adjusted, correspondingly adjusting the call form of the intelligent dialogue robot according to current status information of the calling subscriber, wherein the call form of the intelligent dialogue robot comprises at least one of timbre, volume, intonation and speaking speed,
   wherein the obtaining a calling subscriber's status information in real time comprises: obtaining an intent conveyed by the calling subscriber and the calling subscriber's call form in real time, and determining the calling subscriber's status information according to the obtained information, wherein the calling subscriber's call form comprises at least one of volume, intonation and speaking speed,
   wherein the method further comprising:
   before making the call, obtaining basic character setting set by the called subscriber for the intelligent dialogue robot, the basic character setting comprising a male's voice and a female's voice, and obtaining tag information of the incoming call number; and
   correspondingly adjusting the call form of the intelligent dialogue robot in conjunction with the basic character setting of the intelligent dialogue robot, the tag information of the incoming call number and the current status information of the calling subscriber.

2. The method according to claim 1, wherein
   the method further comprises: after the call ends, updating the tag information of the incoming call number according to a call content.

3. The method according to claim 1, wherein
   the correspondingly adjusting the call form of the intelligent dialogue robot comprises: determining a call form suitable in the current situation by querying a preset correspondence relationship table, and adjusting the call form of the intelligent dialogue robot to the determined call form.

4. An electronic device, wherein the electronic device comprises:
   at least one processor; and
   a memory communicatively connected with the at least one processor; wherein,
   the memory stores instructions that may be executed by the at least one processor, the instructions, when executed by the at least one processor, causing the at least one processor to execute a call processing method, wherein the method comprises:
   obtaining a calling subscriber's status information in real time while an intelligent dialogue robot is used to make a call with the calling subscriber;
   when it is determined that a call form of the intelligent dialogue robot needs to be adjusted, correspondingly adjusting the call form of the intelligent dialogue robot according to current status information of the calling subscriber, wherein the call form of the intelligent dialogue robot comprises at least one of timbre, volume, intonation and speaking speed,
   wherein the obtaining a calling subscriber's status information in real time comprises: obtaining an intent conveyed by the calling subscriber and the calling subscriber's call form in real time, and determining the calling subscriber's status information according to the obtained information, wherein the calling subscriber's call form comprises at least one of volume, intonation and speaking speed,
   wherein the method further comprising:
   before making the call, obtaining basic character setting set by the called subscriber for the intelligent dialogue robot, the basic character setting comprising a male's voice and a female's voice, and obtaining tag information of the incoming call number; and
   correspondingly adjusting the call form of the intelligent dialogue robot in conjunction with the basic character setting of the intelligent dialogue robot, the tag information of the incoming call number and the current status information of the calling subscriber.

5. The electronic device according to claim 4, wherein
   the method further comprises: after the call ends, updating the tag information of the incoming call number according to a call content.

6. The electronic device according to claim 4, wherein
   the correspondingly adjusting the call form of the intelligent dialogue robot comprises: determining a call form suitable in the current situation by querying a preset correspondence relationship table, and adjusting the call form of the intelligent dialogue robot to the determined call form.

7. A non-transitory computer-readable storage medium storing computer instructions, wherein the computer instructions enable the computer to execute a call processing method, wherein the method comprises:
   obtaining a calling subscriber's status information in real time while an intelligent dialogue robot is used to make a call with the calling subscriber;
   when it is determined that a call form of the intelligent dialogue robot needs to be adjusted, correspondingly adjusting the call form of the intelligent dialogue robot according to current status information of the calling subscriber, wherein the call form of the intelligent dialogue robot comprises at least one of timbre, volume, intonation and speaking speed,
   wherein the obtaining a calling subscriber's status information in real time comprises: obtaining an intent conveyed by the calling subscriber and the calling subscriber's call form in real time, and determining the calling subscriber's status information according to the obtained information, wherein the calling subscriber's call form comprises at least one of volume, intonation and speaking speed,
   wherein the method further comprising:
   before making the call, obtaining basic character setting set by the called subscriber for the intelligent dialogue robot, the basic character setting comprising a male's voice and a female's voice, and obtaining tag information of the incoming call number; and correspondingly adjusting the call form of the intelligent dialogue robot in conjunction with the basic character setting of the intelligent dialogue robot, the tag information of the incoming call number and the current status information of the calling subscriber.

8. The non-transitory computer-readable storage medium according to claim 7, wherein the method further comprises: after the call ends, updating the tag information of the incoming call number according to a call content.

\* \* \* \* \*